June 12, 1956 J. GAUCI 2,749,948
MACHINE FOR ASSEMBLING COIL SPRINGS
Filed Feb. 14, 1951 6 Sheets-Sheet 1
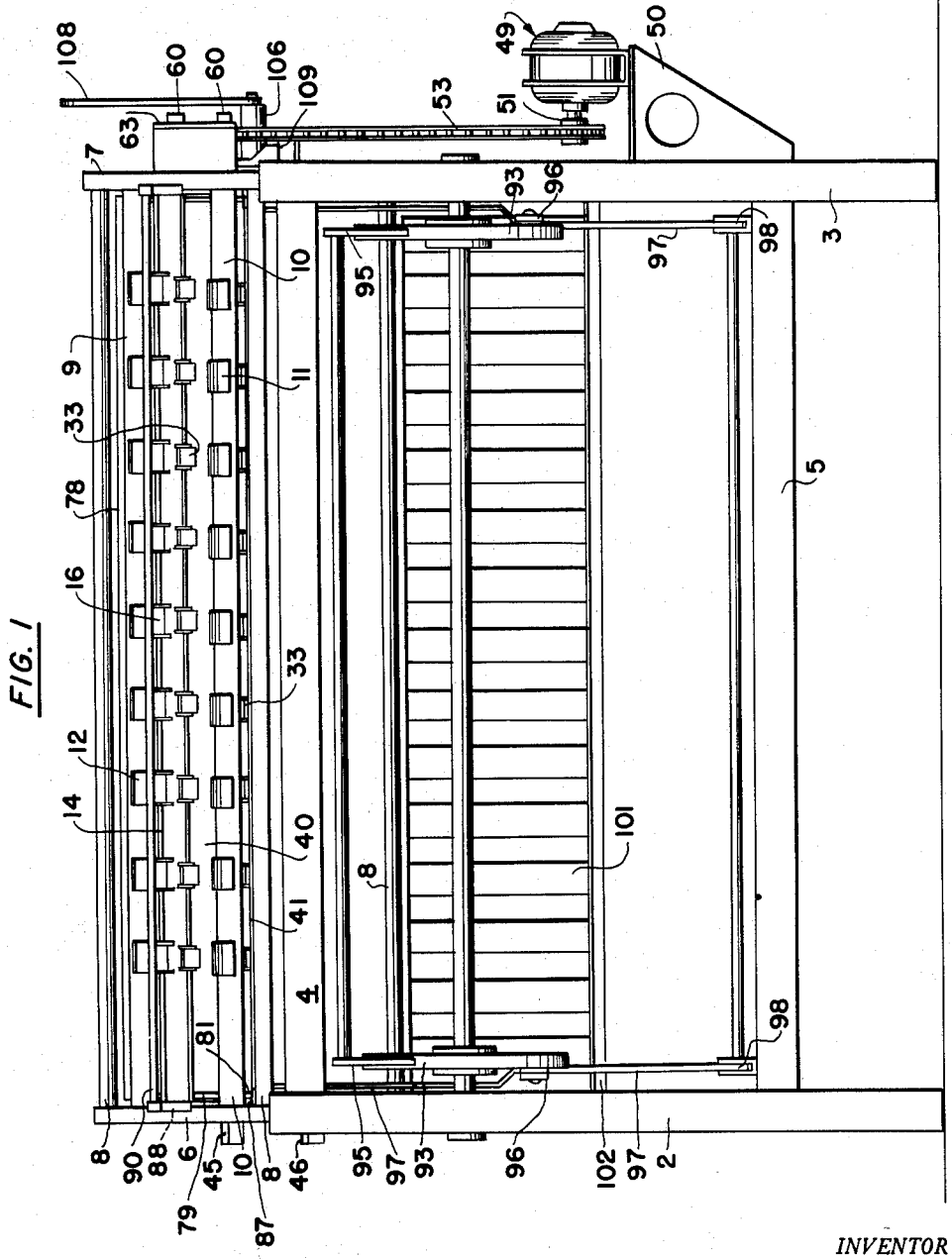
INVENTOR
JOSEPH GAUCI

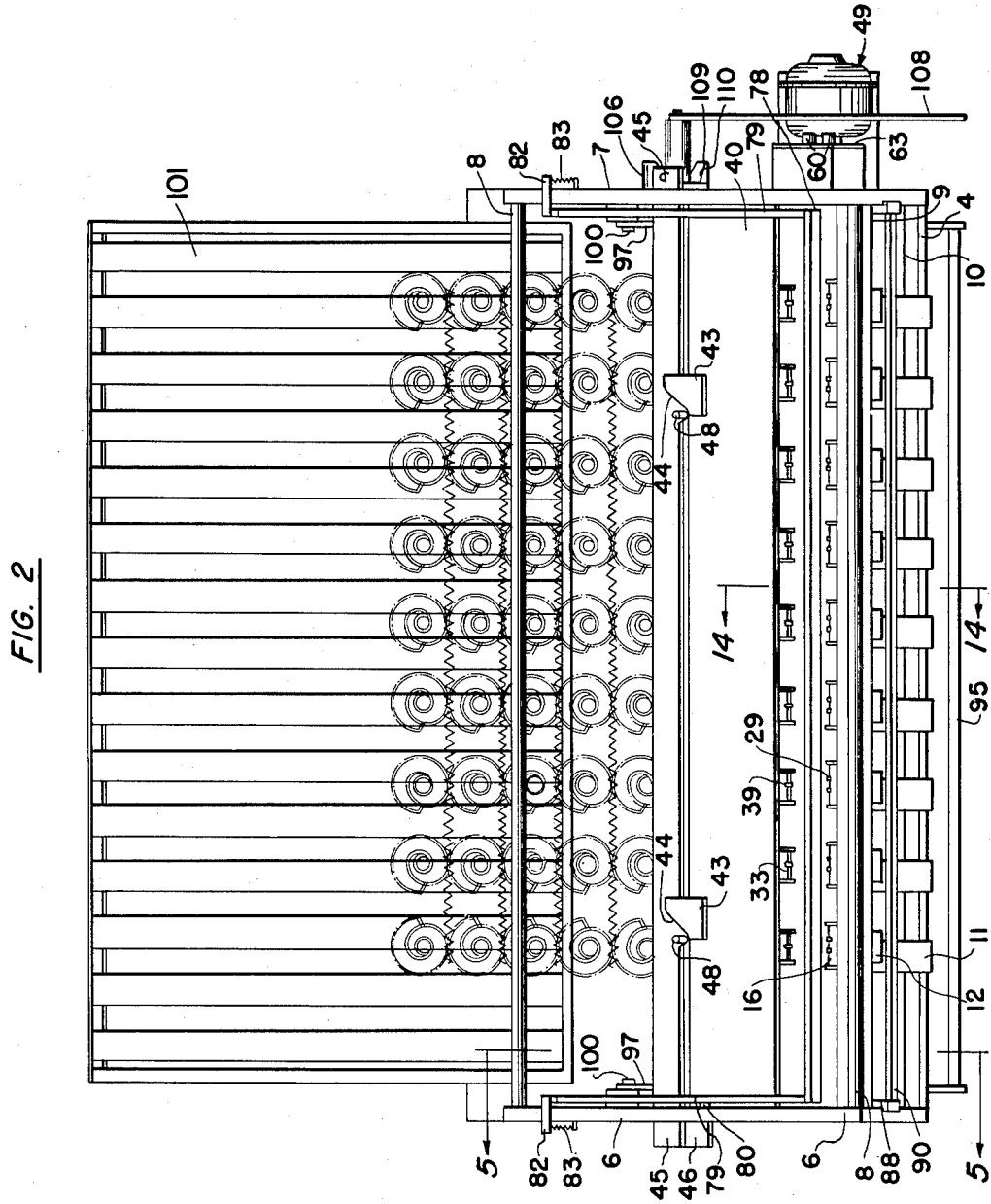

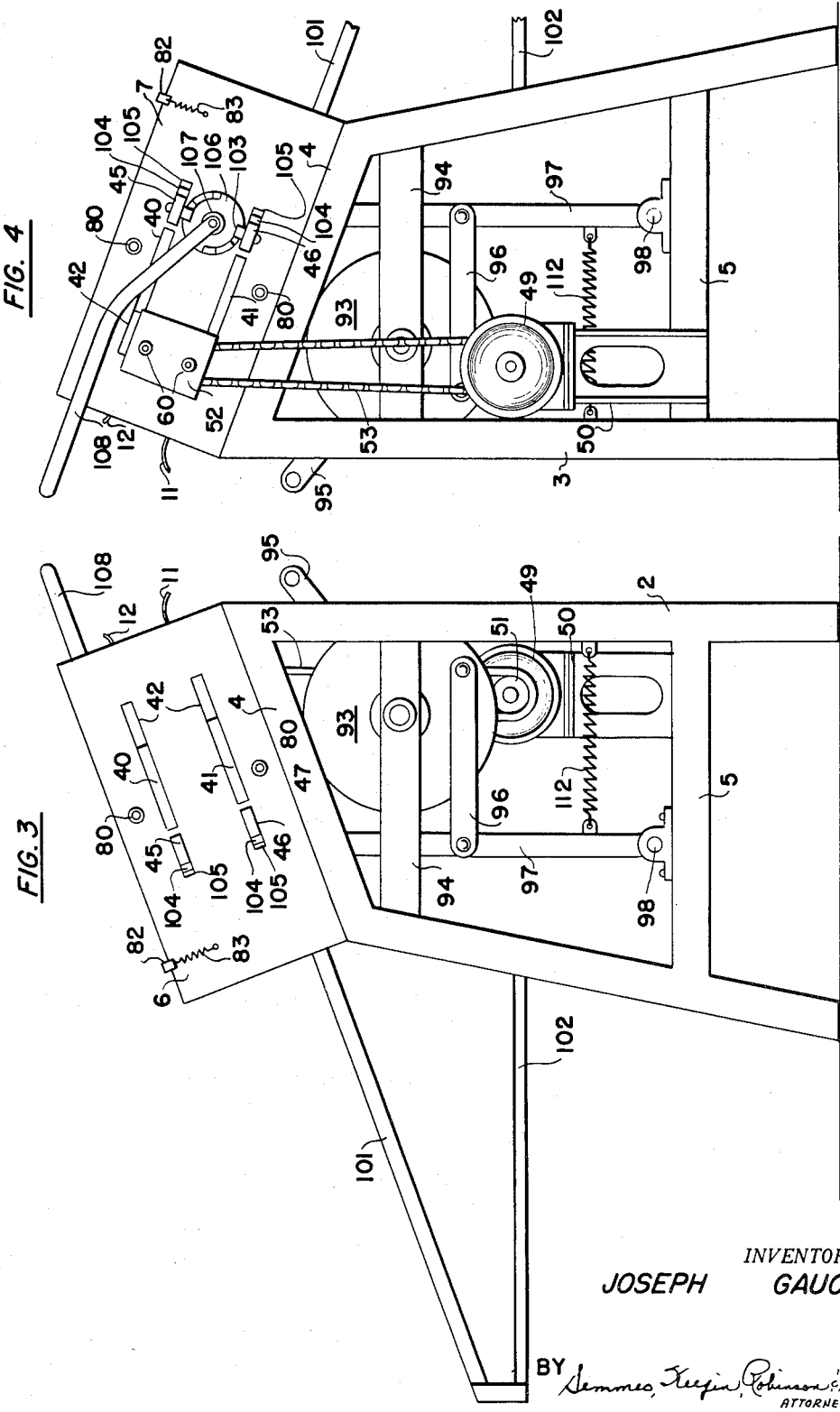

June 12, 1956 J. GAUCI 2,749,948
MACHINE FOR ASSEMBLING COIL SPRINGS
Filed Feb. 14, 1951 6 Sheets-Sheet 4
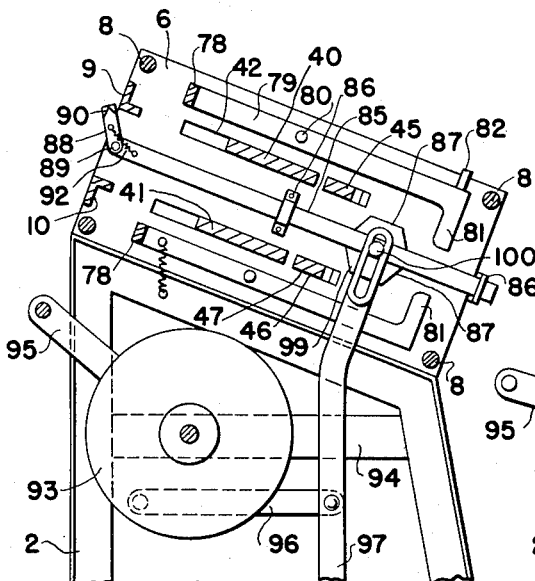
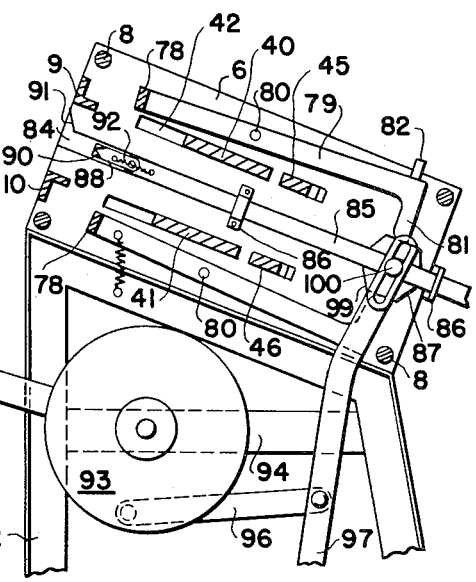
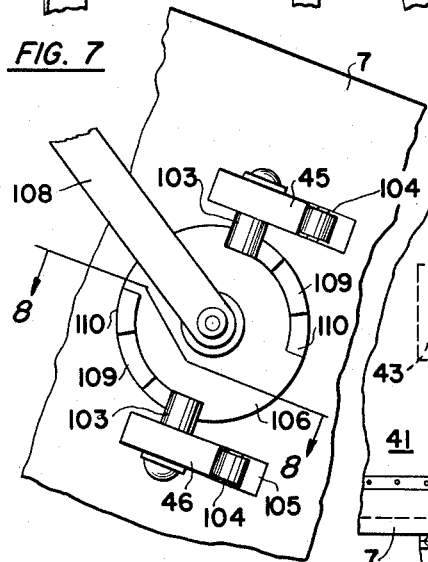
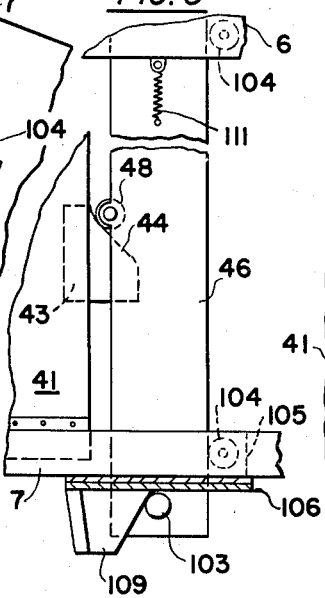
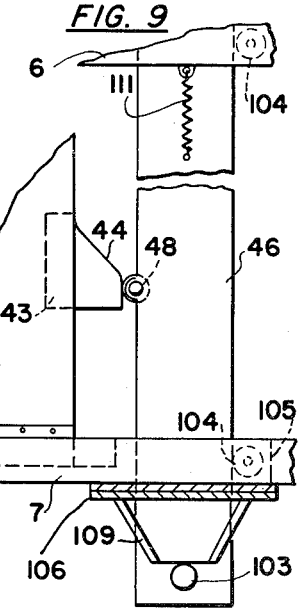
INVENTOR
JOSEPH GAUCI
BY Semmes, Keegin, Robinson & Semmes
ATTORNEYS June 12, 1956  J. GAUCI  2,749,948
MACHINE FOR ASSEMBLING COIL SPRINGS
Filed Feb. 14, 1951  6 Sheets-Sheet 5
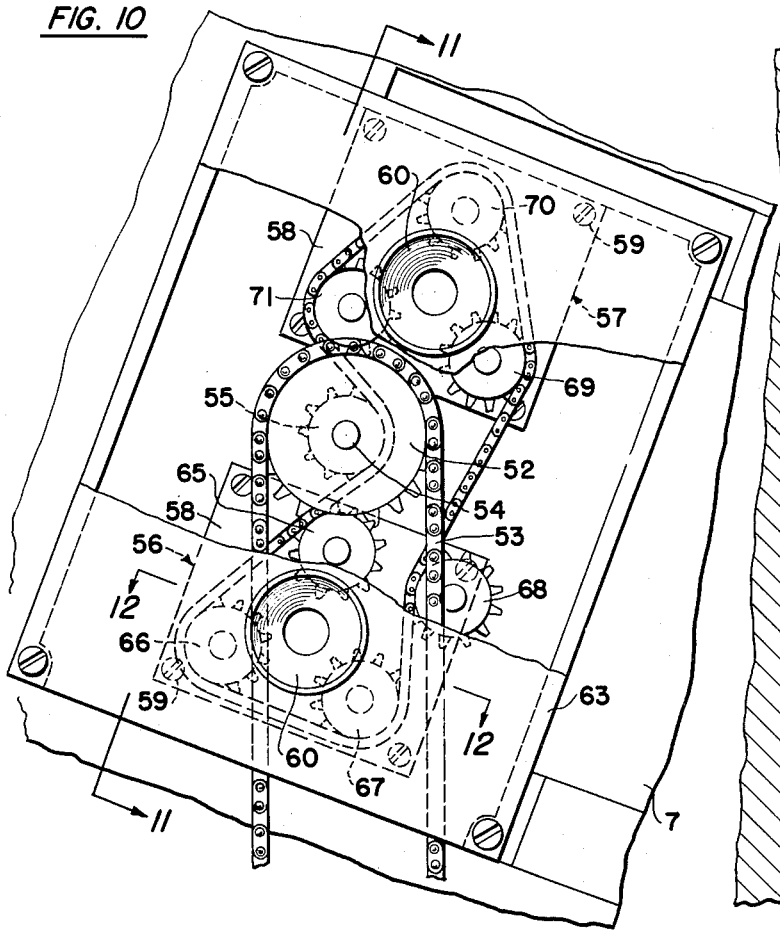
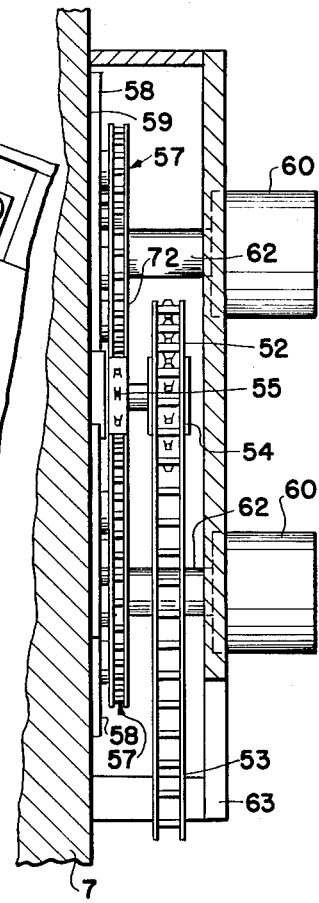
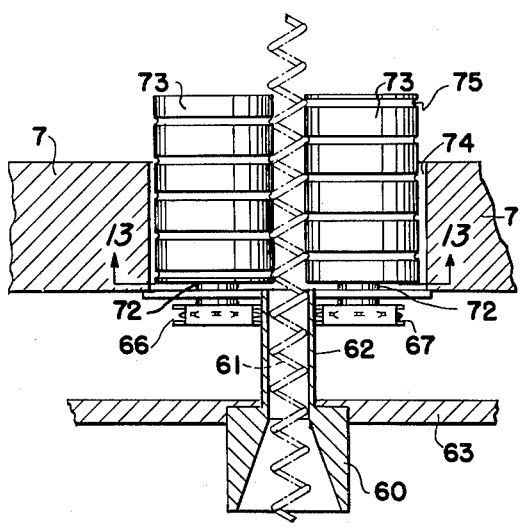
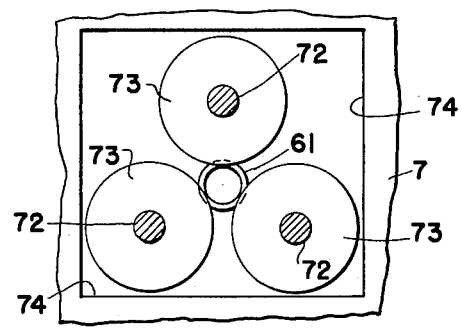
INVENTOR
JOSEPH GAUCI
BY *Semmes, Keegin, Robinson & Semmes*
ATTORNEYS

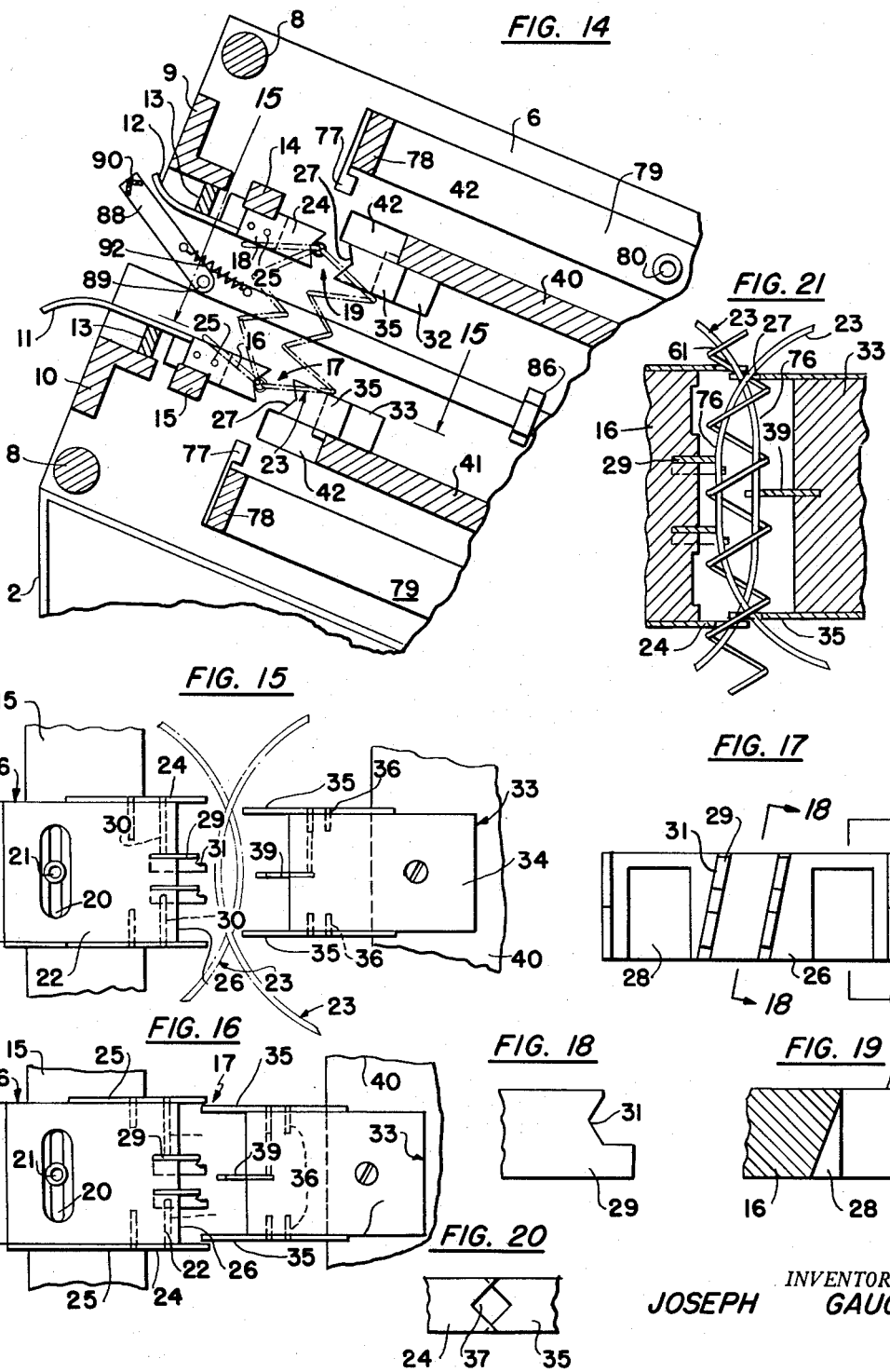

United States Patent Office 2,749,948
Patented June 12, 1956

2,749,948

MACHINE FOR ASSEMBLING COIL SPRINGS

Joseph Gauci, Jersey City, N. J.

Application February 14, 1951, Serial No. 210,927

3 Claims. (Cl. 140—92.94)

This invention relates to a machine for assemblying coil springs. It is particularly directed to a machine for assemblying hour-glass shaped coil springs by means of helical wires interconnecting upper and lower convolutions, respectively, of adjacent rows of said springs.

One object of this invention is to provide in a machine of the character described, highly improved clamping means to squeeze overlapping convolutions of pairs of said springs into straighter shape so that more turns of a helical wire may be interengaged with the squeezed or clamped portions of said convolutions. In accordance with the present invention separate driving means are provided for turning and advancing the helical binding wires into engagement with the squeezed together portions of the top and bottom convolutions of the springs. In accordance with the present invention, furthermore, each clamp comprises seven fingers, four on one clamp jaw and there on an opposite clamp jaw, the three fingers being aligned with the three spaces between the four fingers of the first jaw of the clamp. One jaw is fixed and the other jaw is movable toward the fixed jaw.

Another object of this invention is to provide in a machine of the character described, improved guides for the helical binding wires, each guide comprising a pair of members formed with half holes so that when said members are together tubular holes are formed for guiding the helical wires, as they are fed into binding engagement with the spring coils.

Another object of this invention is to provide in a device of the character described, a cross bar movable to push a row of assembled springs forwardly to make room for another row of springs to be assembled, and means to move said cross bar out of the way upon its retraction after a row of springs have been pushed forwardly, to permit insertion of another row of springs.

A further object of this invention is to provide in a machine of the character described, a cross handle bar which when moved will operate mechanism to compress the adjacent portions of a pair of adjacent rows of assembled springs to clear the squeezing clamps, and which will upon further movement of the handle bar operate said cross bar for pushing the assembled and squeezed together rows of springs forwardly to make room for a next set for springs which are to be inserted into the machine for assembly.

A still further object of this invention is to provide in a machine of the character described, an elongated handle at one side of the machine, which when rotated by the operator controls mechanism for operating the squeeze clamps for simultaneously squeezing together upper convolutions of the coil springs, and also lower convolutions of the coil springs, so as to facilitate their assembly with the helical binding wires.

Still another object of this invention is to provide in a device of the character described, highly improved means for rotating and longitudinally feeding helical wires to assemble the coil springs, said means comprising an upper head and a lower head, each head comprising three rollers, one of which is grooved for rotating and feeding one of the helicals, the arrangement being such that the upper head comprises a pair of aligned lower rollers and a top roller disposed therebetween, and the bottom head comprises a pair of upper rollers and a lower roller disposed therebetween. All of the rollers are provided with sprocket wheels engaged by a sprocket chain, the upper roller of the top head and the lower roller of the bottom head being movable toward each other when the sprocket chain is moved, to automatically grip the helicals for feeding and rotating the same when the mechanism is set into motion.

Still another object of this invention is to provide in a device of the character described squeeze clamps comprising jaws having V shaped grooves to engage the upper and lower convolutions respectively of the coil springs, and certain of said jaws having extensions to keep the helical binding wires from jumping out of place.

A still further object of this invention is to provide a strong and durable machine of the character described, which shall be relatively inexpensive to manufacture, and easy to control, which shall be sure and positive in operation, and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, Fig. 1 is a rear vertical view of a machine embodying the invention;

Fig. 2 is a side elevational view thereof;

Fig. 3 is a top plan view of said machine;

Fig. 4 is a cross-sectional view taken on line 4—4 of Fig. 1;

Fig. 5 is a vertical enlarged cross-sectional view illustrating the squeeze clamps, but showing the clamps open and the last two rows of springs not yet bound together by helical binding wires;

Fig. 6 is a view similar to Fig. 5 and showing the clamps closed and the coil springs bound together by helical wires;

Fig. 7 is a view similar to Fig. 5 but showing the compression clamps moved toward each other and the cross pusher bar advanced forwardly toward the assembled coil springs, and showing the squeeze clamps separated after the convolutions have been assembled by the helical binding wires;

Fig. 8 is a top plan view of the lower clamps in a position of Fig. 6;

Fig. 9 is a cross-sectional view taken on line 9—9 of Fig. 7;

Fig. 10 is a side elevational view illustrating the drive for the heads which rotate and advance the helical binding wires;

Fig. 11 is a cross-sectional view taken on line 11—11 of Fig. 10;

Fig. 12 is a cross-sectional view taken on line 12—12 of Fig. 8;

Fig. 13 is a bottom plan view of the structure shown in Fig. 12 with portions broken away and in cross-section;

Fig. 14 is a cross-sectional view taken on line 14—14 of Fig. 4;

Fig. 15 is a cross-sectional view taken on line 15—15 of Fig. 14;

Fig. 16 is a cross-sectional view taken on line 16—16 of Fig. 2;

Fig. 17 is a vertical view of the upper driving head for the coil binding wire; and Fig. 18 is a crosss-sectional view taken on line 18—18 of Fig. 4.

Referring now in detail to the drawing, 10 designates a machine embodying the invention. The same comprises a base frame 11. Said base frame 11 comprises vertical side members 13 of angular cross-section, having aligned rear flanges 13a and parallel forwardly extending flanges 13b. At the lower ends of the vertical members 13 are base plates 14. The flanges 13a are interconnected by a horizontally extending cross brace 15 disposed in a vertical plane. Extending forwardly from the brace 15 is a top horizontal flange 15a.

Extending from the upper ends of the side legs 13 are forwardly and downwardly inclined top members 17 comprising side flanges 17a and top flanges 17b. Members 17 extend downwardly at an angle of about 30° to the horizontal. Extending from the forward ends of side members 17 are downwardly and forwardly inclined front legs 19 disposed at about 60° to the horizontal and comprising side flanges 19a and front flanges 19b. At the lower ends of the legs 19 are base plates 20.

The rear legs 13 are interconnected by a lower cross brace 21 provided with a horizontal forwardly extending flange 21a. Each pair of side legs 13, 19 are interconnected by a lower horizontal side brace 22 and an upper horizontal side brace 23. The lower side brace 22 has a top flange 22a. The brace 23 has a top flange 23a.

Supported on each of the top members 17 is a vertical substantially rectangular plate 25 inclined forwardly and downwardly. Each plate 25 has a front edge 25a, a rear edge 25b and a top edge 25c. The edges 25a and 25b are parallel to one another and the edge 25c is parallel to leg 17. The plates 25 are interconnected by a pair of similar symmetrically disposed transverse members 26 and 27. Member 26 comprises a forwardly extending flange 26a and an upwardly extending flange 26b. Member 27 comprises a flange 27a parallel to flange 26a and a flange 27b in alignment with flange 26b. Members 26 and 27 may be fixed to the plates 25 in any suitable manner. Flanges 26b and 27b are adjacent the edges 25b of plates 25. Flanges 26a and 27a are parallel to edges 25c. The plates 25 are furthermore formed with a pair of aligned slots 28, 29. The slots 28 are in alignment with the flanges 26a. The slots 29 are in alignment with the flanges 27a. Plates 25 are also interconnected at their rear edges 25a by angle shaped cross bar 30 having a vertical downwardly extending flange 30a in alignment with the edges 25a, and a rearwardly and upwardly inclined flange 30b. Said plates 25a are also interconnected by a transverse cross bar 32.

It will be noted that the rear ends of the slots 29 terminate short of the forward edges of flanges 27a, and also that slots 28 terminate short of the flange 26a.

The plates 25 are also formed with top and bottom parallel slots 33 and 34 disposed above and below the slots 28 and 29 respectively, and disposed parallel thereto. The plates 25 are furthermore formed at their inner surfaces with downwardly and forwardly inclined through grooves 35 for the purpose hereinafter appearing. At their rear ends the grooves 35 have upwardly curved enlargements shown at 36.

Attached to the base frame 11 is a bed 40. Said bed 40 comprises a pair of forwardly and upwardly extending brackets 41 fixed to the upper flanges 19b of the front legs 19. Supported on the cross bar 32 and flanges 30b of the cross member 30 are a pair of downwardly and forwardly projecting side bed bars 42. Attached to the forward ends of said bars 42 are pins 43 supporting a front cross brace 44. Supported on the cross brace 44 and on flange 30b and disposed beneath the cross bar 32, are a plurality of parallel coplanar bed bars 45 adapted to receive the assembled springs as they are worked through the machine and pushed forwardly.

Supported within the upper slots 28 is an upper front clamp holder 46 disposed at an inclined plane and slidable to a limited extent, for the reason that the slots 28 are of greater length than the width of member 46. Member 46 may be provided with an upwardly extending reinforcing rib 47.

Supported within the lower slots 29 in plates 25 is a lower front clamp holder 48 likewise slidable forwardly and rearwardly and being inclined and parallel to member 46. Extending downwardly from member 48 is a reinforcing rib 49.

Attached to the upper side of lower holder 48 and movable therewith is a row of spaced squeeze clamps 50 equally spaced apart and similar to one another, except that at one end of the row is a clamp 51 which differs from the clamps 50 in the manner hereinafter to be described.

Each clamp 50 comprises a plate 52 formed with a transverse slot 53, to receive a headed screw 54 screwed into holder 48 for adjustably fixing the plate to the holder. The plate 52 is substantially rectangular in shape. Fixed to the sides thereof as by screws 55 are a pair of parallel clamp jaws 56 formed at their forward ends with V-shaped notches 57. Extending from the lower ends of the notches 57 are finger extensions 58. The front end of each plate 52 is formed with a pair of parallel slots 60 and inserted therein are a pair of intermediate clamp jaws 61 likewise notched at their forward ends. The jaws 61 are disposed in planes inclined to the vertical, for the purpose hereinafter appearing. They are fixed in place in any suitable manner.

The end clamp 51 comprises a clamp plate 62 to the sides of which are attached a pair of parallel clamp jaws 63 likewise notched at their forward ends. Between the clamp jaws 63 is a middle clamp jaw 64 notched at its forward end. Plate 62 is likewise formed with a transverse slot 65 to receive a headed screw 66 for adjustably fixing the clamp plate 62 to the holder 48. The clamp jaw 64 is inclined similar to the clamp jaws 61. It is centrally located between the clamp jaws 63. The spaces between clamp jaw 64 and clamp jaws 63 are substantially the same as the spaces which separate the clamp jaws 56 and 61.

Attached to the underside of the upper movable holder 46 is a row of clamps 51 movable therewith and similar to the clamp 51 described hereinabove, and somewhat offset with respect to the lower clamp members 50 and spaced thereabove. Also attached to the holder 46 and disposed above the end clamp 51 on holder 48 but offset with respect thereto, is an end clamp 50.

Adjustably fixed to the upper surface of the bottom flange 27a and aligned with the clamps 50 on lower holder 48 are a plurality of clamps 51. Aligned with the lower front clamp 51 on holder 48 is a lower rear clamp 50 on flange 27a. Attached to the underside of the upper flange 26a and aligned with the upper front clamps 51 on holder 46 is a row of clamps 50. At the end of the upper row of clamps on flange 26a, however, is a clamp 51 which is aligned with the end clamp 50 on the holder 46. The clamps 50, 51 on flanges 26a and 27a are fixed clamps, whereas the clamps on the holders 48, 49 are movable toward and away from the fixed clamps. The clamps on flanges 27a are symmetrical with and in alignment with the clamps on holder 48. The clamps on flange 26a are symmetrical with and in alignment with the clamps on holder 46.

It will be noted that the jaws 63 and 64 of the clamps 51 are aligned with the spaces between the jaws 56 and 61 of the clamps 50. As the holders 46, 48 are pushed in the manner hereinafter to be described, upwardly and rearwardly toward the flanges 26a, 27a, the fingers of the clamps 51 on the holders 46 and 48 move toward the spaces of the clamps 50 on flanges 26a and 27a, and the spaces between the jaws 56, 61 of clamps 50 on the holders 46, 48 move toward the fingers 63, 64 of clamps 51 on flanges 26a and 27a. All of the clamps are adjustable transversely as described above.

Fixed to each of the plates of the upper fixed clamps on the underside of the flange 26a is a rearwardly and upwardly curved guide plate 70. The front ends of each guide plate 70 are attached to the jaw plate by a screw 71. Said guide plate is formed with a longitudinal slot 72. Slidable between plate 70 and flange 26a are sliding blocks 73 each formed with a forwardly and downwardly projecting finger 74 passing through slot 72. Each block 73 is interconnected to a pin 75 fixed to member 70 by a coil tension spring 77 which tends to slide the block 73 downwardly and forwardly. The finger 74 is spaced from plate 70 as shown in Fig. 5.

Attached to the plates of the fixed clamps on the lower fixed flange 27a are downwardly and rearwardly curved guide plates 70, symmetrical to the top guide plates and they are likewise provided with grip fingers 74, normally urged downwardly and forwardly by springs 77 in the manner described above. Thus the construction of the guides and gripping fingers on the plates of the lower clamps are similar and symmetrical to the construction of the guides and fingers on the upper clamps.

It will now be understood that a row of coil springs of the hour-glass type, well known for use in upholstery and bed springs, may be manually inserted or mounted between the upper and lower clamps on the fixed flanges 26a, 27a respectively. The springs are designated by the letter S in the drawings. Each spring has a lower convolution C and an upper convolution C'. The row of springs may now be inserted into the rear of the machine, one spring being inserted between each pair of guide plates 70. The springs are inserted with the machine in the position shown in Fig. 5, with the holders 46, 48 moved downwardly and forwardly (in the manner hereinafter appearing) and with the clamps on said movable holders spaced from the fixed clamps on flanges 26a, 27a. Thus a whole row of springs is inserted. The lower convolutions C snap beneath the fingers 74 on the lower clamps. The upper convolutions C' snap beneath the fingers 74 of the upper clamps. The forward ends of the convolutions rest in front of the jaws of the fixed clamps, as shown in Fig. 5 of the drawing.

In Fig. 5 there is also shown a set of springs S mounted on and between the holders 46, 48. These springs S are shown already assembled with another row of springs disposed in front of them. The top and bottom convolutions respectively of the second and third row of springs are bound together by helical wires H. Thus in Fig. 5 the row of springs between the flanges 26a, 27a will be called the first row, the row between the holders 46, 48 will be called the second row, and the next adjacent row will be called the third row. It will be noted that the top convolutions of rows 1 and 2 overlap each other and the bottom convolutions of rows 1 and 2 likewise overlap each other. Also, it will be noted that the overlapping portions of said convolutions are disposed between the notches in the jaws of the clamps.

Means is provided to squeeze the overlapping portions of these convolutions together so that they become straighter, whereby when a helical wire H is threaded thereon, in the manner hereinafter appearing, a greater number of coils of the helical wire H will engage the squeezed together overlapping portions C and C'. To this end there extends from the rear ends of plates 46, 48, cams 81 formed with inclined cam edges 82. Extending through the openings 33, 34 are transverse cam actuating bars 85. The bars 85 are slidable longitudinally of themselves in a transverse direction. Said bars are guided by rollers 85a mounted on pins disposed within the front ends of said slots 33, 34.

Fixed to one end of each bar 85 is a pin 86 and mounted thereon is a follower roller 87. The pins 86 point toward each other and are in alignment. Fixed to the outer side of one plate 25 is a pin 88. Rotatably mounted on pin 88 is a drum shaped cam member 89. Cam member 89 comprises a back plate 90 from which extends a cylindrical cam wall 91. Extending from the plate 90 is a central hub 92 formed with a socket 93 receiving the pin 88. The cylindrical wall 91 is formed with a pair of similar, symmetrical notches 94 forming cam edges 95 engaged by the follower rollers 87. At the front end of the hub 92 is a transverse slot 96. Received within the slot 96 is the front end 97 of an elongated handle 98 extending rearwardly. The portion 97 of the handle 98 which is received in the slot 96 is fixed to the hub by means of screws or other fastening means 99. The handle 98 extends rearwardly and upwardly and may be grasped by the operator standing at the rear of the machine 10.

It will now be understood that when the operator grasps the rear end of the handle and moves the handle downwardly, or in a counterclockwise direction, looking at Fig. 2, drum 89 will likewise be rotated in a counterclockwise direction, causing the cam edges 95 to engage the follower rollers 87, for pulling the cam actuating bars 85 to the left, looking at Fig. 3.

On each bar 85 are a pair of follower rollers 100 contacting the cam edges 82 of the cams 81 of members 46, 48. When the bars 85 are moved to the left, looking at Fig. 3, the engagement of the follower rollers 100 with the cam edges 82 will cause the members 46 and 48 to be slidably moved upwardly and rearwardly to bring the clamps 50, 51 thereon towards the fixed clamps 50, 51 on the fixed members 26a, 27a, for squeezing the overlapping portions of the upper and lower convolutions C, C' of the coils S in rows 1 and 2 together, and thereby tending to straighten them and bring them closer to superposed positions, as shown particularly in Fig. 8.

When the handle bar 98 is raised or moved in a clockwise direction, looking at Fig. 2, the bars 85 are moved to the right by coil tension springs 101 interconnecting pins 101a on bars 85 with the pins 101b on one of the plates 25. When that is done the slidable members 46, 48 are pulled downwardly and forwardly away from the fixed clamps by suitable springs, as will appear hereinafter, to thereby separate the squeeze clamps.

The reason that the lower jaws are offset with respect to the upper jaws, as shown in Fig. 1, is because the upper and lower convolutions of the coil springs S are offset with respect to one another. Thus the overlapping portions of the upper convolutions are offset with respect to the overlapping portions of the lower convolutions of the coils S and the squeezing clamps must be correspondingly offset.

Means is provided to feed helical wires H and to rotate the same, so that they screw onto and around the overlapping and squeezed together or clamped together portions of the convolutions C, C'. To this end there is mounted on one side of the machine frame, a bracket 110 on which is mounted an electric motor 111 having a central armature shaft 112. On shaft 112 is a sprocket wheel connected by a sprocket chain 113 to a sprocket wheel 114 on a shaft 115 supported on a plate 115a fixed to the adjacent side plate 25. On said shaft 115 and rotatable therewith is a smaller sprocket wheel 116.

The plate 115a is formed with a pair of aligned lower bearings 120 and a pair of aligned upper bearings 121. It is also formed with a pair of parallel side bars 122 and 123 which extend above and below said plate. Said bars 123 are formed with longitudinal slots 124. Fixed to the side bars 122, 123 are corner brackets 125 supporting a plate 126 parallel to the plate 115a. Attached to the bars 125 is a rear curved protector or cover plate 125a to enclose the drive mechanism for the feed rollers. Pivoted to the bar 122 as on pivots 127 and 128 are pivot arms 130 and 131 formed with projections 132 and 133 passing through the slots 124. Screwed to the upper and lower ends of the bar 123 are aligned limit screws 134 projecting into the slots 124, and engaging the arms 132, 133 of the pivot members 130, 131 respectively. Interposed between the arms 132 and 133 and the inner end of the slots 124 are coil compression springs 135 which tend to swing the pivot arms 130, 131 outwardly away from each other about the pivot pins 127, 128, respectively.

Journaled in bearing openings 120 are shafts 137 carrying sprocket wheels 138. Journaled in the bearings 121 are shafts 140 carrying sprocket wheels 141. The upper pivot arm 130 is formed with a bearing 142 in which is journaled a shaft 143 carrying a sprocket wheel 144. The lower pivot arm 131 is formed with a bearing opening 145 in which is journaled a shaft 146 carrying a sprocket wheel 147. On shaft 143 is a roller 150 formed with external circular grooves 151. On shafts 140 are rollers 152. The rollers 150, 152 project through an opening 153, in the adjacent plate 25. On shaft 146 is a roller 154 formed with external circular grooves 155. On shafts 137 are rollers 156. The rollers 154, 156 project through an opening 157 in the adjacent plate 25. Disposed about the sprocket wheels 144, 141, 138 and 147 is a sprocket chain 160, which meshes with the sprocket wheel 116 on the shaft 115. Means is provided to take up slack in the sprocket chain 160. To this end there is fixed to arm 122 an arm 160a formed with a longitudinal slot 160b. Fixed thereto in adjusted position as by screw 160c passing through the slot 160b is an arm 160d carrying a shaft 160e. Carried by said shaft is a sprocket wheel 160f meshing with the chain 160.

It will now be understood that when the motor is operating, shaft 115 rotates, causing the sprocket chain 160 to be moved. As this is accomplished the pressure against sprocket wheels 144 and 147 will cause the lever arms 130 and 131 to be moved toward each other, against the pressure of the springs 135, and thereby causing the rollers 150 and 154 to be moved toward each other.

The plate 126 supported by the bars 125 is formed with a pair of openings 162. Supported by plate 126 and extending through the openings 162 are parallel guide tubes 163. The inner surfaces of the guide tubes 163 are formed with helical internal grooves 164. The coil wires H are fed through the tubes 163. Said tubes have flaring mouths 165 to facilitate insertion of the wires therein. The tubes 163 extend towards the adjacent plate 25 but terminate short thereof. The helical wires H are inserted through the tubes 163 and rotated therein until they engage with the rollers 150 and 154 respectively. Thereafter when the motor is operated, all the rollers rotate and due to the engagement of the helical wires H with the helical grooves 151 and 155 in the rollers 150 and 154 respectively, the helical coils H are rotated and moved longitudinally. The tubes 163 are so located as to feed the upper helical H in the space between the three top rollers 150, 152 and the lower coil H is fed in the space between the rollers 154, 156. The tubes 163 furthermore are so located as to bring the coils H into such position that they will screw about the clamped together overlapping portions of the convolutions C and C' of coils S of the first two rows. The inclined jaws 61, 64 facilitate coiling of the wires H.

Thus, when the overlapping convolutions are clamped together as shown in Fig. 6, by pressing down on the elongated handle 98, the motor can be started for feeding the helicals to bind the clamped together convolutions together. Since the overlapping portions of the convolutions C, C' are clamped together and squeezed almost straight, as shown in Fig. 8, more turns of the helical H will screw on to the overlapping portions of said convolutions.

Means is provided to guide the helicals as they are fed into binding engagement. To this end there is fixed to flange 27a between the lower clamps thereon, angle shaped members 170. Each member 170 comprises a flange 171 contacting the underside of flange 27a and formed with a longitudinal transverse slot 172 receiving a headed screw 173 which fixes member 170 to flange 27a in adjusted position. Extending upwardly from flange 171 is a flange 175 formed at its front surface with a transverse semi-cylindrical groove 176. It is also formed with a blind opening 177 near its lower surface.

Attached to the lower holder 48 is a member 170 symmetrical with respect to the member 170 described above. It is also formed with a semi-cylindrical groove 176 and with a blind opening 177. It is attached to the holder 48 by means of a headed screw 173 passing through a slot 172 to permit adjustment.

Members 170 are aligned with one another and symmetrically disposed with respect to one another. Furthermore, not only are the members 170 attached to flange 27a and holder 48, but similar members are attached to the upper flange 26a and the upper holder 46.

Disposed within each pair of aligned openings 177 is a coil compression spring 180. It will now be observed that when bar 85 is moved to the left, looking at Fig. 9, springs 180 will press the upper and lower holders 46, 48 downwardly and forwardly to separate the movable clamps on said holders from the fixed clamps on the flanges 26a, 27a.

When the movable holders 46, 48 are moved upwardly toward the fixed flanges 26a, 27a, the springs 180 are compressed and the two semi-cylindrical grooves 176 form cylindrical openings through which the helicals H pass. These cylindrical openings serve as guides for the helicals.

The flanges 171 of members 170 are furthermore formed with aligned openings 182 to receive guide pins 183 which serve to align the movement of the movable clamps with respect to the fixed clamps. Any other suitable guide means may be employed.

It will now be understood that when the movable holders 46, 48 are opened up or moved from the position shown in Fig. 6 to the position shown in Fig. 7, the convolutions of springs S in rows 1 and 2 remain bound together by the helicals.

Means is provided to compress the bound together springs of rows 1 and 2 to clear the clamps and to then push the bound together and compressed springs downwardly and forwardly to make room for a new set of springs to be inserted and to be bound to the last bound row. To this end there is mounted on the brace 23 of the frame a pair of horizontally aligned bearings 185 supporting a transverse shaft 185a. Mounted on said shaft and disposed inside of the legs 13 are discs 186. Fixed to each disc 186 is an upwardly and rearwardly inclined bar 187 from which extends upwardly a bar 188. The upper ends of the bars 188 are interconnected by a transverse horizontal rear pusher handle bar 189. When the bar 189 is pressed downwardly the discs 186 will rotate in clockwise directions looking at Fig. 4.

On the side brace 22 are bearings 190 supporting pivots 191. On each pivot 191 is an arm 192 connected by a link 193 to a pin 194 on one of the discs 186 and disposed below the shaft 185a. Thus when the handle bar 189 is pressed downwardly and the discs 186 are rotated, links 193 will move forwardly to pivot the pivot arms 192 in a counterclockwise direction about their pivotal points 191.

A coil tension spring 195 interconnects each pivot arm 192 with an anchor 196 on the leg 13 of the base frame, for normally biasing the pivot arms 192 in clockwise directions, looking at Fig. 4. Each pivot arm 192 is formed adjacent its upper end with a longitudinal slot 197.

Slidably mounted in each groove 35 at the inner surface of plate 25 is a longitudinal slide bar 200. Fixed to the inner side of each plate 25 adjacent the edge 25a thereof is a guide bracket 201 to guide the bar 200. Fixed to each bar 200 is a pin 202 which passes through slot 197. Fixed to opposite sides of each bar 200 are cams 203 having similar, symmetrical inclined cam edges 204, inclined forwardly and toward the bar 200, for the purpose hereinafter appearing.

On the inside of each plate 25 are a pair of pivots 205 located on opposite sides of bar 200. Pivoted to said pivot pins 205 are similar, symmetrical levers 206. Each lever 206 has an arm 207 extending forwardly of the pivot, and an arm 208 extending rearwardly of the pivot. Fixed to the forward end of each arm 207 is a cam projection or member 209 adapted to be engaged by cam edge 204 upon sliding the bar 200 downwardly and forwardly.

It will now be understood that when the handle bar 189 is pressed downwardly, discs 186 will be rotated to swing the pivot arms 192 forwardly and thereby slide the bars 200 downwardly and forwardly causing cam edges 204 to engage the inner ends of projections or lugs 209, thereby causing the levers 206 to rotate about their pivots 205 to bring the rear ends of their arms 208 toward each other.

Fixed to the inner side of each plate 25 adjacent the upper edge thereof and adjacent the rear end thereof, is an upper bracket 210. Each bracket 210 has a bottom wall 211 extending away from plate 25 and a wall 212 parallel to plate 25 and formed with a longitudinal slot 213. Extending upwardly from the bottom wall 211 are parallel walls 214 and 215. Each wall 214 is formed with a slot 216. The brackets 210 are open at the top. The rear end of each arm 208 projects through the slot 216 into the bracket 210.

Slidably mounted within each bracket 210 is a block 217 to which arm 208 is pivoted by means of a pivot pin 218. Interconnecting the blocks 217 in the two aligned upper brackets 210 is a horizontal cross bar 220. There are lower brackets 210 attached to the inner surfaces of the plates 25 adjacent the lower edges thereof, and in alignment with the aforementioned brackets 210, and symmetrically disposed with respect thereto and similar thereto. These lower brackets 210 also have blocks 217 slidably mounted therein and pivoted to the arms 208 of the lower levers 206. These blocks 217 are also interconnected by a horizontal cross bar 220. Thus the bars 220 are parallel to one another.

Springs 221 interconnect the upper bar 220 with fixed pins 222 on the upper brackets 210. Said springs normally tend to raise the upper bar 220. Coil tension springs 223 interconnect the lower bar 220 with fixed fingers on the base frame to bias the lower bar 220 downwardly. Fixed to the upper bar 220 are downwardly projecting pronged forks 225 so located as to engage the bound crossing portions of the upper convolutions of the coil springs S. Attached to the lower bar 220 are upwardly projecting pronged forks 225 adapted to engage the bound together crossing convolutions at the lower ends of the coil springs S.

It will now be understood that when the pusher handle 189 is pressed downwardly and the bars 220 are slidably moved downwardly and forwardly and the levers 206 are rotated, the bars 220 will be moved toward each other, causing the upper and lower prongs 225 to compress the bound together overlapping convolutions of the coils, thereby compressing the coil springs S and moving the bound together convolutions inwardly toward each other and away from the clamping jaws, so as to clear the latter.

Means is provided for pushing the assembled springs downwardly and forwardly after they have cleared the clamping jaws. To this end there is pivoted to the rear ends of the bars 200, as on pivots 230 a transverse pusher member 231 comprising side arms 232 interconnected by a horizontally extending cross bar 233. The cross bar 233 is interconnected to the bars 200 by coil tension springs 234. The springs 234 tend to rotate member 231 in a counterclockwise direction, looking at Fig. 4 of the drawing.

It will be noted that before the handle 189 is pushed downwardly the bar 233 is disposed substantially at the level of the top flanges 26a, so as not to interfere with insertion of springs in between the clamps on the flanges 26a, 27a. However, as the bars 200 move downwardly to compress the bound together springs, the outer ends of the cross bar 233 will engage within the cam grooves 36 and will swing in clockwise directions relative to the bars 200, looking at Fig. 4, moving from the position shown in Fig. 4 to the position shown in Fig. 7. As that is done the cross bar 233 will push the bound together and compressed springs downwardly and forwardly, moving the springs in row 1 to the position of the springs in row 2 and leaving room for later insertion of another row of springs to be assembled.

After the handle 189 is fully depressed and the bound together springs are compressed and then pushed forwardly, the handle 189 is raised thereby reversing the operation and moving the prongs 225 away from each other back to the position shown in Fig. 4, and moving the bars 200 upwardly and rearwardly to permit member 231 to be moved to the position shown in Fig. 4. In such position it has cleared the space necessary for insertion of another set of springs in between the top and bottom fixed clamps.

The sequence of operation is as follows. First insert a first set of springs into place between the upper and lower fixed clamps by hand, engaging the upper and lower convolutions with the spring fingers 74 which accurately position the springs. Then depress the elongated handle 98 to move the movable clamps on holders 46, 48 toward the fixed clamps for squeezing the forward ends of the convolutions of the inserted springs. Then put in helicals through the top and bottom tubes 163. Then close the motor switch for the motor 111 to feed the helicals into engagement with the upper and lower convolutions of the first row of springs. Then lift the long handle 98 to open the clamps. Then push down on the handle 189 to compress the springs to clear the clamps and to push the first row of springs into the second position. Then bring the front handle 189 up again to normal position. Then insert a next row of springs by hand between the upper and lower fixed clamps. Then depress the handle 98 again to squeeze together the overlapped portions of the convolutions of springs S in position 1 and 2. Then again feed in the helicals and operate the motor to bind together the squeezed together overlapped convolutions. Then again lift the handle 98 to open the clamps. Then again depress the bar 189 to compress the bound together top and bottom convolutions and to push the first set of springs to position 3, and the second set of springs to position 2. Then bring up the handle 189 and feed in a new set of springs into position 1. This operation is repeated as many times as required.

As the rows of springs are bound together and fed downwardly they will slide onto the bed 40 on top of the bars 45. When it is desired to terminate the assembly, the entire unit of assembled springs may be pulled downwardly and pulled out of the bed.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. In a machine for assembling coil springs, means to rotate and longitudinally feed simultaneously a pair of helical wires around overlapping portions of said springs, said means comprising a first set of three rollers for feeding the first helical wire, said set comprising a pair of parallel rollers on fixed axes, a roller disposed therebetween and mounted on a shaft, a movable bearing for said shaft, one of the rollers of the first set being formed with a helical groove, and the other two rollers having smooth surfaces a sprocket wheel rotatable with each of said rollers, a second set of rollers for rotating and feeding a second helical wire, comprising a second pair of rollers on fixed axes and spaced from the first pair of rollers, a roller disposed between the second pair of rollers, a shaft for the last roller of the second set, a movable bearing for said last shaft, a sprocket wheel movable with each of the rollers of the second set, a single sprocket chain on all said sprocket wheels, means for taking up the slack in said sprocket chain, means to guide helical wires between each set of three rollers, and means for feeding said sprocket chain to coact with the slack take up means to press the rollers on the shafts on the movable bearings into engagement with the helical wires.

2. In a machine for assembling coil springs, means to rotate and longitudinally feed simultaneously a pair of helical wires around overlapping portions of said springs, said means comprising a first set of three rollers for feeding the first helical wire, said set comprising a pair of parallel rollers on fixed axes, a roller disposed therebetween and mounted on a shaft, a movable bearing for said shaft, one of the rollers of the first set being formed with a helical groove, and the other two rollers having smooth surfaces a sprocket wheel rotatable with each of said rollers, a second set of rollers for rotating and feeding a second helical wire, comprising a second pair of rollers on fixed axes and spaced from the first pair of rollers, a roller disposed between the second pair of rollers, a shaft for the last roller of the second set, a movable bearing for said last shaft, a sprocket wheel movable with each of the rollers of the second set, a single sprocket chain on all said sprocket wheels, means for taking up the slack in said sprocket chain, means to guide helical wires between each set of three rollers, means for feeding said sprocket chain to coact with the slack take up means to press the rollers on the shafts on the movable bearings into engagement with the helical wires, and resilient means to move the rollers of the two sets which are mounted on movable bearings away from the rollers in said sets having fixed axes.

3. In a machine for assembling coil springs, the means to rotate and longitudinally feed a helical wire around overlapping portions of said springs, said means comprising a set of three rollers mounted on shafts arranged in parallel relationship to each other and having axes of rotation disposed in substantially angular relationship to each other and having surfaces arranged to provide a feed channel for helical wire between the same, said set comprising a pair of rollers mounted on fixed bearings and a third roller mounted to rotate on a shaft provided with a movable bearing, one of the rollers of said set being formed with a helical groove and the other two rollers being formed with smooth surfaces, means for resiliently pressing the roller mounted on the movable bearing away from the rollers mounted on the fixed bearings, a sprocket wheel secured to and rotatable with each of said rollers, a single sprocket chain linearly engaged with all of said sprocket wheels, means for taking up the slack in said sprocket chain, driving means comprising a single sprocket chain arranged to coact with the slack take up means to cause pressure to be applied on the helical wire in its channel by a pulling action of the sprocket chain engaged with said sprockets, said pulling action being against the action of said resilient means, whereby the movable grooved roller will be moved toward the two fixed rollers to provide enough pressure on the helical wire at the root diameter of the groove in the grooved roller to drive the helical wire longitudinally and this pressure will be varied automatically in accordance with the force required to drive such helical wire.

References Cited in the file of this patent

UNITED STATES PATENTS

| | | |
|---|---|---|
| 1,905,459 | Gail | Apr. 25, 1933 |
| 1,907,323 | Kirchner | May 2, 1933 |
| 1,920,862 | Heuer | Aug. 1, 1933 |
| 1,922,002 | Karr | Aug. 8, 1933 |
| 2,026,276 | Erickson | Dec. 31, 1935 |
| 2,031,894 | Krakauer | Feb. 25, 1936 |
| 2,112,991 | Madden | Apr. 5, 1938 |
| 2,176,262 | Kirchner | Oct. 17, 1939 |
| 2,262,994 | Dickey | Nov. 18, 1941 |
| 2,275,209 | Turgeon | Mar. 3, 1942 |
| 2,286,326 | Zimmerman | June 16, 1942 |
| 2,311,326 | Birkin | Feb. 16, 1943 |
| 2,388,106 | Woller | Oct. 30, 1945 |
| 2,414,372 | Frankel | Jan. 14, 1947 |
| 2,470,812 | Gauci | May 24, 1949 |